United States Patent [19]
Treer

[11] 3,741,573
[45] June 26, 1973

[54] TOOL HOLDER FOR A MACHINE TOOL OR THE LIKE

[76] Inventor: Steven J. Treer, 5271 Spencer Road, Lyndhurst, Ohio 44124

[22] Filed: July 12, 1971

[21] Appl. No.: 161,507

[52] U.S. Cl. .................. 279/81, 219/69 E, 83/698, 90/11 A, 279/1 E, 279/75, 279/30
[51] Int. Cl. ...................... B23b 31/10, B23k 9/16
[58] Field of Search ................. 219/69 R, 69 V, 68, 219/144, 161, 69 E; 279/1 B, 81, 1 E, 22, 30, 75; 90/11 A; 83/698

[56] References Cited
UNITED STATES PATENTS
3,342,502  9/1967  Young ................................ 279/81
FOREIGN PATENTS OR APPLICATIONS
266,696  5/1950  Switzerland ......................... 279/75

*Primary Examiner*—Francis S. Husar
*Attorney*—Baldwin, Egan, Walling & Fetzer

[57] ABSTRACT

A tool holder adapted for mounting on a machine, for removably retaining therein a tool having an elongated shank. The holder has gripping means for gripping the tool shank and securely holding it in predetermined position in the holder, and eject means adapted for coaction with the tool shank for ejecting the tool from the holder upon release of the gripping means. A cam is movably mounted on the holder body for actuating and deactuating the gripping means and the ejecting means respectively, depending upon the selected movement of the cam. Means are also provided for precisely locating the tool with respect to the holder, for indexing the tool to a predetermined position with respect to the holder, and for supplying fluid to the tool via the tool receiving passage in the holder.

14 Claims, 9 Drawing Figures

PATENTED JUN 26 1973 3,741,573
SHEET 1 OF 3
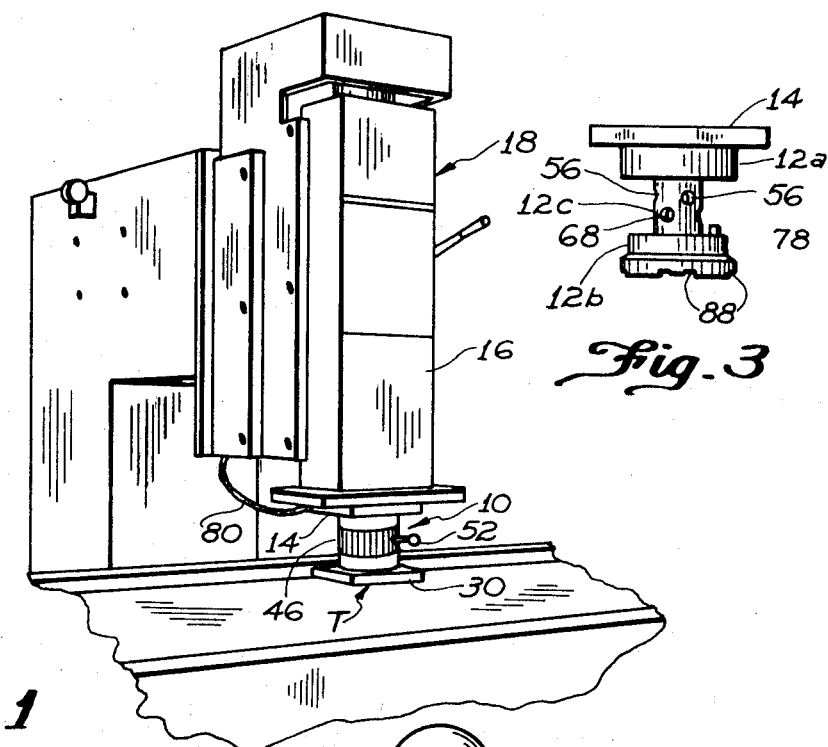
Fig. 1
Fig. 3
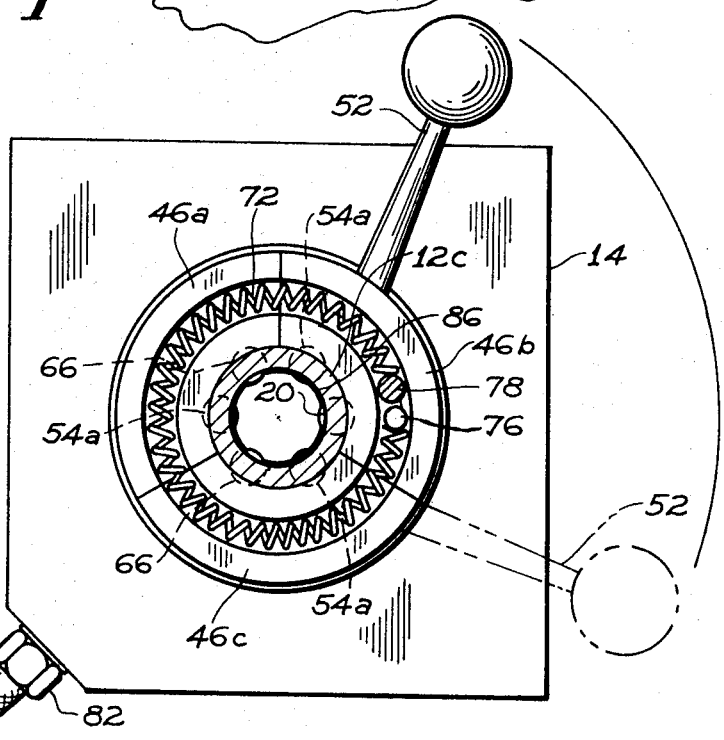
Fig. 6
INVENTOR.
STEVEN J. TREER
BY
Baldwin, Egan, Walling & Fetzer
ATTORNEYS INVENTOR.
STEVEN J. TREER
BY
Baldwin, Egan, Walling & Fetzer
ATTORNEYS

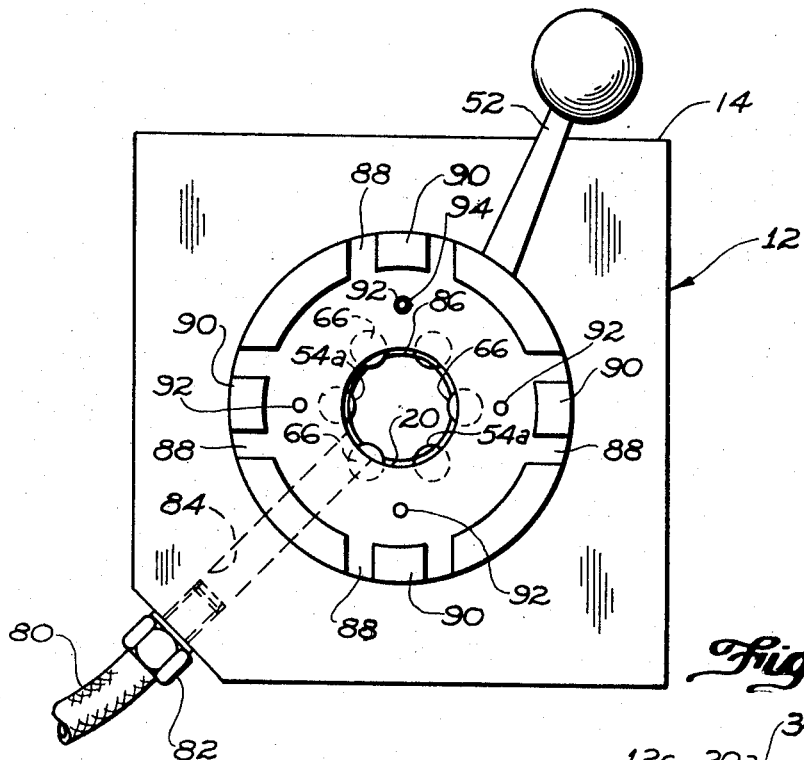
Fig. 4
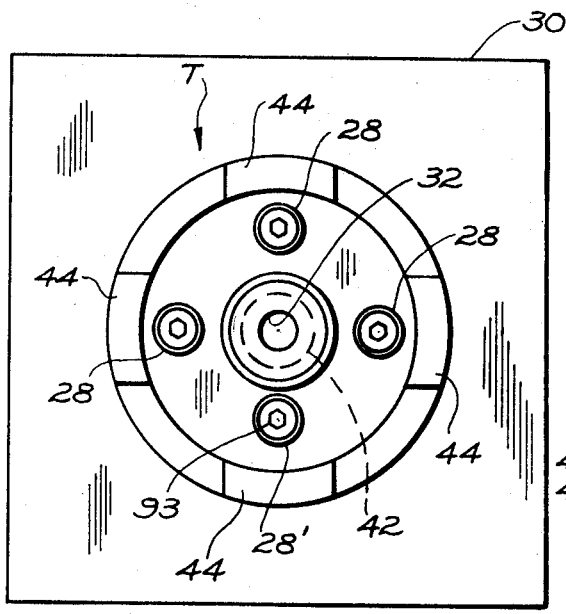
Fig. 9
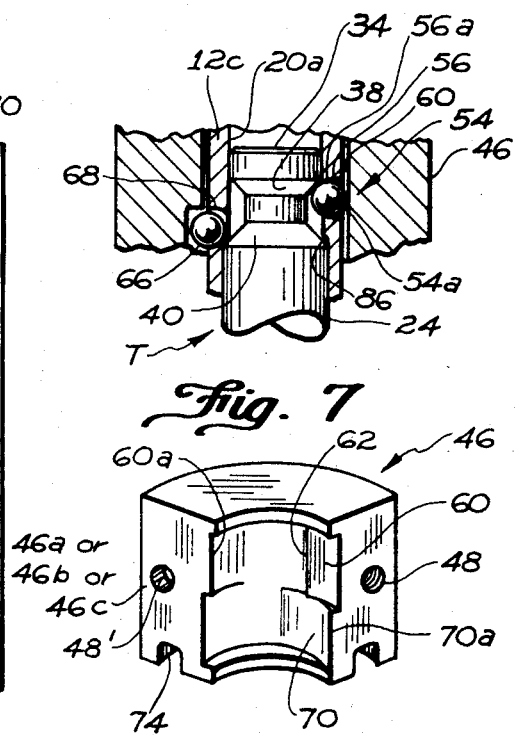
Fig. 7
Fig. 8
INVENTOR.
STEVEN J. TREER
BY
Baldwin, Egan, Walling & Fietzer
ATTORNEYS

TOOL HOLDER FOR A MACHINE TOOL OR THE LIKE

This invention relates to tool holders, and more particularly to a quick change tool holder for holding machine tools.

BACKGROUND OF THE INVENTION

Many types of tool holders for holding a tool in proper position to engage or coact with a workpiece in the manner desired are known in the art. These tool holders often times utilize ball-like members as the gripping means for gripping the tool and retaining it in the holder. One such prior art arrangement in shown in U.S. Pat. No. 3,398,965 issued Aug. 27, 1968 to J. R. Cox and entitled "Quick Change Tool Holder."

However, many of these prior art mechanisms do not operate as effectively as desired, or are unduly complex, or are not economically feasible. Moreover, the prior art arrangements with which Applicant is familiar do not embody any means for facilitating removal or ejection of the tool from the holder, so that another tool can be expeditiously substituted for the first tool.

SUMMARY OF THE INVENTION

The present invention provides a novel quick change tool holder which is effectively operable to hold or retain a tool in proper position for coaction with a workpiece in the manner desired, and which has means to permit ready release and removal of one tool and replacement with another tool, together with means for accurately aligning the tool with respect to the holder. The present invention is shown in the environment of an electrical discharge machine wherein the tool embodies an electrode for forming an accurately dimensioned opening of predetermined shape in a workpiece. However, the holder can be used with other types of machine tools in addition to an electrical discharge machine tool.

Accordingly, an object of the invention is to provide a novel tool holder, which will effectively hold a tool in proper position with respect to a workpiece and which embodies means for facilitating the removal of one tool and replacement thereof with another.

Another object of the invention is to provide a tool holder of the above type wherein the means for gripping the tool comprises ball-like members which are adapted for movement from an inactive position to an active position and vice versa, for gripping a tool shank, and wherein the ball-like members are actuated by means of a rotatable-like cam.

A further object of the invention is to provide a tool holder of the above discussed type wherein the means for facilitating removal of one tool and replacement thereof by another tool comprises ball-like members which are actuated by the abovementioned cam when the cam is moved or rotated in a predetermined direction.

A still further object of the invention is to provide a tool holder of the aforediscussed type which embodies means for accurately aligning the tool with respect to the holder and with respect to the tool receiving passage in the holder, and utilizing a novel arrangement of lug and recess means on the tool and the holder.

A still further object of the invention is to provide a tool holder which has index means thereon for predetermining an indexed position or positions of the tool with respect to the holder.

Other objects and advantages of the invention will be apparent from the following description taken in conjunction with the accompanying drawings wherein:

BRIEF DESCRIPTION OF THE DRAWINGS

FIG. 1 is a fragmentary, perspective illustration of a tool holder constructed in accordance with the present invention and mounted on a machine tool, which as illustrated is an electrical discharge machine tool, and with the holder mounting a tool having a square or block shaped electrode thereon;

FIG. 3 is a reduced size elevational view of the body of the holder of FIG. 2, with the gripping means and actuating cam mechanism having been removed;

FIG. 4 is a bottom plan view of the holder of FIG. 2 taken generally along the plane of line 4—4 of FIG. 2 looking in the direction of the arrows;

FIG. 6 is a sectional view taken generally along the plane of line 6—6 of FIG. 2 looking in the direction of the arrows and illustrating the spring means coacting with the cam means for urging the latter to a position operative to actuate the gripping means of the holder to active condition;

FIG. 7 is a reduced size sectional view illustrating the coaction of the gripping means with the shank of the tool, for retaining the tool in the holder;

FIG. 8 is a perspective view of one of the segments of the cam mechanism, showing the raised cam surfaces thereon for actuating the gripping means and the ejecting means of the holder; and FIG. 9 is a reduced size, top plan view taken generally along the plane of line 9—9 of FIG. 5 looking in the direction of the arrows.

DESCRIPTION OF THE PREFERRED EMBODIMENTS

Figure 2:
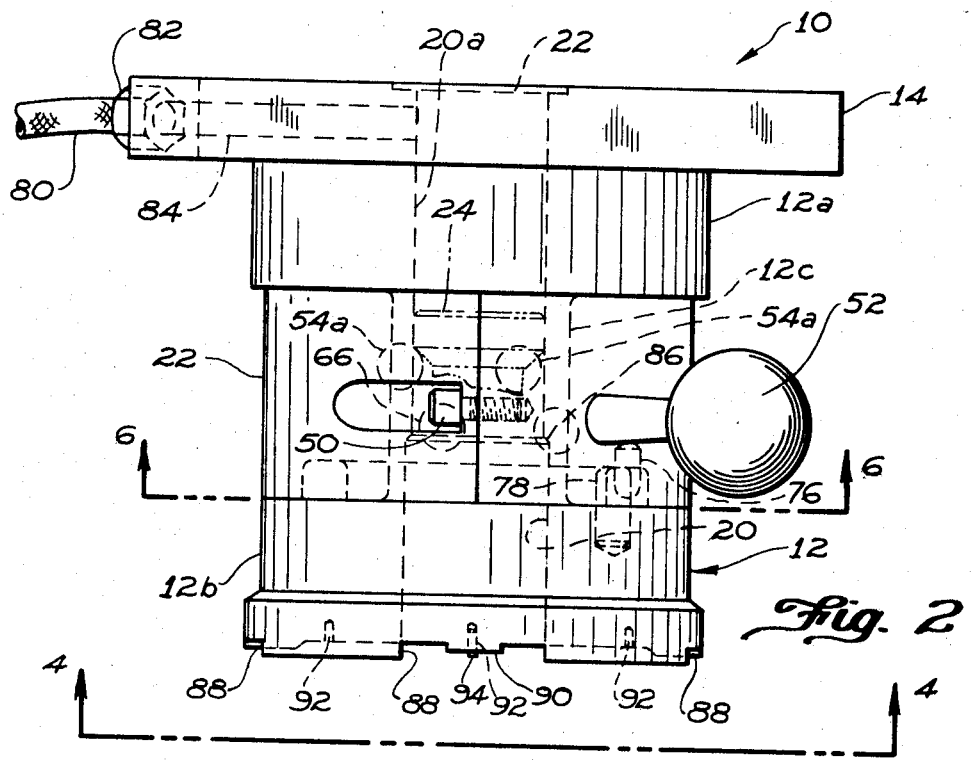
FIG. 2 is an enlarged, elevational view of the holder shown in FIG. 1.

While the present holder can be adapted for various environmental uses, it has been chosen to disclose the same as a holder for holding an electrode tool in an electrical discharge machine, which as is known in the art is utilized to accurately form openings in a workpiece, utilizing electrical energy. However, it will be understood that the invention can be readily utilized in other environmental situations, such as, for instance, screw machines or drill presses, or any environment wherein it is desirable to accurately position a tool with respect to a workpiece and wherein ready release of the tool from the holder and replacement by another tool is desirable.

The tool holder 10 comprises a body portion 12 which may include a head portion 12a (FIG. 3), a base portion 12b, and a stem 12c connecting the head and base portions. Head portion 12a may comprise a widened flange section 14 for attachment as by means of fasteners or by any other suitable means, to an operating member 16 of the machine tool 18, which as illustrated represents an electrical discharge machine tool.

A passage 20 extends generally axially through the body 12 passing through the stem portion 12c and through the base portion 12b for communicating the exterior of the holder with the passage. In the embodiment illustrated, the passage 20 also extends upwardly through the head portion 12a, but a plug 22 closes the upper end of the passage.

The tool T (FIGS. 5 and 9) comprises a shank portion 24, which in the embodiment illustrated is of circular configuration in horizontal cross section, with the shank of the tool being adapted to be received in the aforementioned passageway 20, for mounting the tool on the holder 10.

The shank 24 of the tool T is attached at its lower or proximate end to a base section 26 which is then attached as by means of threaded fasteners 28 or any other suitable fastening means, to the tool proper, which in this instance is represented by an electrode 30 of block-like configuration. Alternately, it will be noted that the tool shank 24 has an axially extending passageway 32 therein, extending from the distal end portion 34 of the shank, through the base section 26 and through the electrode 30, to communicate with the exterior undersurface of the electrode. Passageway 32 may include a threaded portion 32a, which may receive a threaded fastener, such as a bolt, for attaching the electrode 30 to the shank, instead of utilizing the aforementioned fasteners 28. However, preferably, fasteners 28 are utilized for attachment of the electrode.

As can be seen from FIG. 5, the distal end portion 34 of the tool shank is of smaller diameter as compared to the proximate end portion 36, for a purpose to be hereinafter described. Obliquely disposed shoulder portion 38 is provided adjacent the distal end portion 34 of the shank, while obliquely disposed shoulder portion 40 merges with the proximate portion 36 of the shank. Neck section 42 extends between and connects the aforementioned shoulder portions.

Accurately dimensioned lugs 44 are provided on base portion 26 of the tool and project upwardly therefrom, for a purpose to be hereinafter described. It is to be understood that while the electrode portion 30 of the tool T has been shown as a square or block configuration, that any other desired configuration of tool head can be readily provided. In the event that the tool head is not an electrode, any tool head with a shank portion adapted to be received in the passage 20 of the holder 10 can be provided.

Mounted on the base portion 12b of the body 12 of the holder and in encompassing relation to the stem portion 12c is a cam member 46. Cam member 46, in the embodiment illustrated, is formed of three cam sections 46a, 46b, 46c (FIGS. 2 and 6), with such cam sections being provided with a threaded opening 48 and a non-threaded opening 48' (FIG. 8) adapted for receiving threaded fasteners 50 (FIG. 2) for securing the cam sections together in encompassing relation to stem portion 12c of the holder body 12. Cam 46 is provided with a handle 52 secured thereto, and projecting laterally therefrom, for moving or rotating cam 46 on the body 12, and about stem portion 12c.

Gripping means 54 (FIGS. 2 and 7) in the form of circumferentially arranged ball members 54a, are provided for gripping the tool shank when the latter is disposed in fully inserted position in the passage 20, and hold the shank therein. Such gripping balls 54a are disposed in openings 56 (FIG. 3) spaced circumferentially, approximately 120° apart, about stem portion 12c, and communicate with the aforementioned passage 20. Such openings are constricted at their innermost ends, as at 56a (FIG. 7) to prevent movement of the associated ball member 54 completely through the opening into the passage 20. However, as can be seen in FIGS. 6 and 7, such gripping ball members extend into the passage and are adapted for holding engagement with the aforementioned shoulder 38 of the tool shank 24.

Balls 54a are cammed into gripping engagement with the tool shank shoulder 38 by means of the cam 46, which as best shown in FIG. 8 has sloping cam surfaces 60, 60a, formed on each cam section thereof, which coact with the respective gripping ball member 54a, for urging the respective gripping ball member into the passage 20 in gripping coaction with the shoulder 38 on the tool shank. It will be seen that cam surfaces 60, 60a coact on adjacent cam sections, for providing a complete actuating cam surface for each respective ball, with the highest point on the actuating cam surface being along edge 62 of cam surface 60.

Eject means are also provided on the tool holder for initiating ejection of the tool from the holder, when it is desired to change a tool, or substitute another tool for the one in the holder. Such eject means, in the embodiment illustrated, comprises a second set of ball-like members 66, spaced circumferentially about stem portion 12c, and disposed in openings 68, disposed approximately 120° apart about stem 12c, and in staggered relation with respect to grippings balls 54a. Openings 68 are likewise constricted at their mergence with the inner surface of the passage 20 in stem 12c, for preventing movement of the associated ball member 66 completely through the opening. Balls 66 are actuated into active position for ejecting the tool from the holder, by means of the aforementioned cam 46, and upon movement of the cam from one position to another position. Eject balls 66 when moved to active position, are adapted to engage aforementioned shoulder 40 on the tool shank, and urge the tool outwardly of the passage 20.

In the position illustrated in FIG. 7, the gripping balls 54a are being actuated by the cam 46 into gripping or holding condition, and thus as can be seen, the ejecting balls 66 are disposed out of engaging relationship with the associated shoulder 40. Upon movement of the cam handle 52 from the full line position, shown for instance in FIGS. 4 and 6, to the dotdash position of the handle shown in FIG. 6, the cam 46 actuates the balls 66 to extend partially into the passage 20, to cause pushing engagement of the balls 66 against shoulder 40, and thus cause initiation of movement of the tool shank out of the passage. During movement of the cam 46 from its actuating position for the gripping means to its actuating position for the ejecting means, the gripping balls 54a are released from their gripping relationship and move out of interferring relation with the distal head portion 34 of the tool shank, to permit ready removal of the tool T from the holder.

Referring now again to FIG. 8, cam surface 70 on each of the cam sections 46a, 46b, and 46c provides for the aforementioned movement of the ejection balls 66 to active position, to cause ejection of the tool from the holder. The high point of cam surface 70 exists along edge 70a thereof.

Means, such as for instance a resilient spring 72 (FIG. 6) is provided for resiliently urging the cam 46 to the full line position shown in FIG. 6, wherein the gripping means is actuated to grip the shank of the associated tool T. Such spring 72 is adapted to be received in a recess 74 (FIG. 8) formed in the underside of each of the cam sections 46a, 46b, 46c, which when they are assembled form a circular recess.

Pin member 76 (FIGS. 2 and 6) projects into the recess 74 and is mounted on cam section 46b; one end of the spring 72 abuts against such pin 76. Another pin or stud 78 is mounted on the base portion 12b of body 12 of the holder, (FIG. 3) and likewise extends into recess 74 defined by the cam segments. The other end of the spring 72 abuts against pin 78. It will be seen therefore, that the compressed spring is adapted to resiliently urge the cam in a counterclockwise direction (as viewed in FIG. 6) until gripping balls 54a tightly engage shoulder portion 38 on the tool shank. This engagement of course restricts further rotary movement of the cam, and when in such position the cam surfaces 60, 60a are operative to urge the gripping balls 54a into positive gripping coaction with the shank of the tool as aforedescribed, thus holding the tool T in locked condition in the holder.

Movement of the cam by means of handle portion 52 in a clockwise direction (with reference to FIG. 6) causes the cam locking surfaces 60, 60a to release the gripping or locking ball members 54a and causes the ejecting balls 66 to be engaged by the cam surfaces 70, to cause movement of the balls 66 into camming coaction with the shoulder 40, resulting in ejection of the tool shank outwardly from the holder.

Figure 5:
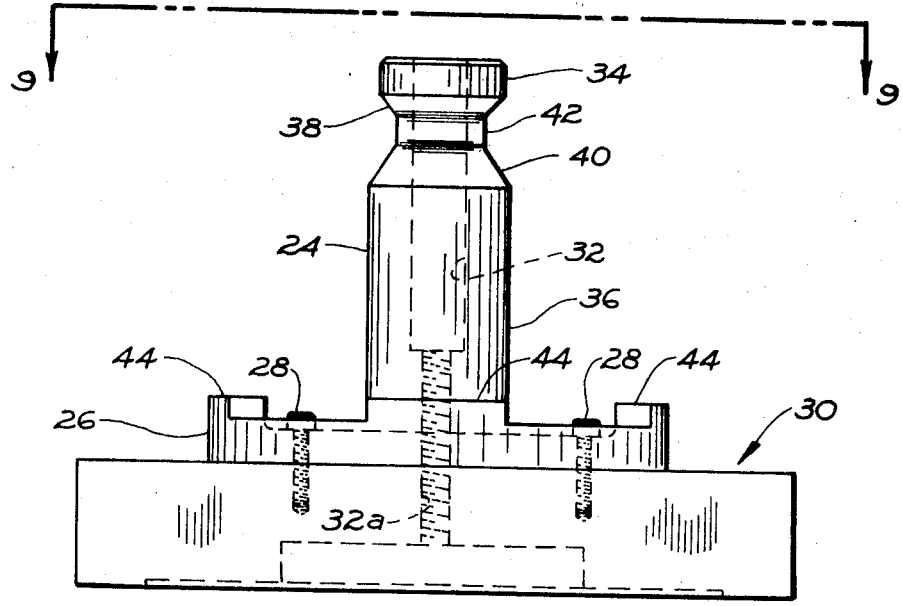
FIG. 5 is an enlarged, elevational view of the shanked tool and attached electrode of block-like shape, adapted for mounting in the holder of FIG. 2.

Referring to FIG. 2, there is preferably provided means for supplying a fluid, such as for instance, dielectric fluid, to the passage 20, and thus to the passage 32 in the tool shank and then exteriorly of the tool head 30 via the passage portion 32a (FIG. 5). Such means, in the embodiment illustrated, comprises a conduit 80 which may be threadedly connected, as 82, to flange 14 of the tool holder, with a passageway 84 communicating therewith and with passage 20 in the holder. The fluid supplied to conduit 80 flows via passageway 84 into passage 20 and thence through passage 32, 32a, in the tool shank, to exteriorly of the electrode 30.

Aforementioned passage 20 in the holder is adapted to have a slip fit with the shank of the tool, so that it can be readily inserted into the holder. A slip fit as used here is meant to define a relatively close fitting condition with say for instance the passage 20 in the holder being made 0.002 of an inch larger in diameter than the diameter of the tool shank 24. However, it will be noted that the aforementioned distal end portion 34 of the tool shank is of a smaller diameter than the proximate portion 36 of the tool shank, and therefore can readily enter into the passage 20. In this connection the upper end portion 20a of passage 20 is constricted down in size and commencing as for instance at 86 (FIG. 2) so that the distal portion 34 of the shank likewise has a slip fit with respect to the passage as does the proximate portion of the shank when the tool is fully inserted into the holder.

The aforementioned lugs 44 on the tool T are adapted to precisely locate the tool with respect to the holder and with respect to the passage 20. In this connection the base portion 12b of the holder body is provided with accurately dimensioned and located slots 88 (FIGS. 2 and 4) which are adapted to receive in close fitting relation the aforementioned accurately dimensioned and located lugs 44 on the base portion 26 of the tool, for accurately locating the tool with respect to the holder and passage. Embossment portions 90 positioned in each of slots 88 limit entry of the lugs 44 into the respective slot, for aiding in removal of the tool from the holder when such is desired. However, with the dimensions and positions of the lugs 44 and the slots 88 precisely controlled for accurately mating relationship, it will be seen that the tool shank 24 does not position the tool with respect to the holder, but instead it is the lugs 44 coacting with the respective slot 88 which positions and locates the tool T with respect to the holder.

Means are also provided for indexing the tool to a predetermined position or positions with respect to the holder, thus insuring a predetermined position relationship of the tool with respect to the holder. In the embodiment illustrated, such indexing means comprises four tapped openings 92 (FIGS. 2 and 4) provided equal distance from the axis of passage 20 on the underside of the base portion 12b of the holder. Set screws may be threaded into one or more of openings 92 and which will project outwardly or downwardly therefrom, and which ordinarily will be received in the socket 93 in the head of the confronting one of fasteners 28 on the tool base section 26 when the lugs 44 are aligned with the respective slot 88, to permit complete entry of the tool shank into the passage 20. However, one (e.g., 28' — FIG. 9) of the fasteners 28 is offset from the axis of passage 20 a different amount than the other fasteners and therefore is positioned for interferring relation with the confronting set screw (e.g., 94) FIGS. 2 and 4 so that the head of the set screw cannot be received in the socket 93 of fastener 28' so that interference between such set screw and the fastener occurs, and the tool shank cannot enter sufficiently into the passage 20 to be gripped or held by the gripping means. It will be seen that with one set screw inserted in one of the openings 92, the tool can be indexed to three positions wherein locking can occur, but in the fourth position interference occurs. With two set screws, two possible indexed positions of the tool are provided for, and with three set screws, only one indexed position of the tool is possible. From the foregoing description and the accompanying drawings it will be seen that the invention provides a novel tool holder for removably retaining a tool having an elongated shank, with the holder having gripping means for gripping the tool and holding it in predetermined position, together with ejecting means adapted for coacting with the tool shank for ejecting the tool from the holder. A cam is movably mounted on the holder body for actuating and deactuating the gripping means and ejecting means depending on the selected movement of the cam. The invention also provides a tool holder having lug and recess means for precisely locating the tool with respect to the holder, and an arrangement for indexing the tool to a predetermined position with respect to the tool holder.

The terms and expressions which have been used are used as terms of description and not of limitation, and there is no intention in the use of such terms and expressions of excluding any of the features shown or described, or portions thereof, and it is recognized that various modifications are possible within the scope of the invention claimed.

I claim:

1. A tool holder comprising a body having a passage therein adapted to receive a shank of a tool, means mounted on said body for movement from an inactive position to an active position and vice versa, for gripping the tool shank when in said active position, cam means movably mounted on said body for rotary movement about the lengthwise axis of said passage and with respect to said gripping means and operative when rotated to one position to move said gripping means to said active position, eject means movably mounted on said body and operative to be moved by said cam means to an active position to initiate ejection of the tool shank from said passage, said rotary movement of said cam means from said one position to a second position, causing said eject means to be moved to said active position, and permitting movement of said gripping means to said inactive position, and spring means coacting between said cam means and said body operative to urge said cam means to said one position and resiliently resist movement of said cam means to said second position.

2. A tool holder in accordance with claim 1 wherein said spring means comprises a compression spring disposed in a recess formed in said tool holder, abutment means on said body engaging one end of said spring, other abutment means on said cam means engaging the other end of said spring, said spring being compressed between said abutment means upon rotary movement of said cam means from said one position to said second position, said abutment means when said cam means is in said one position being disposed generally adjacent to one another.

3. A tool holder in accordance with claim 1 wherein said gripping means comprises a plurality of balls spaced circumferentially substantially evenly about said passage and communicating therewith, the tool shank having shoulder means thereon, said balls when in said active position being adapted to engage the shoulder means on the tool shank for holding the tool on said body.

4. A tool holder in accordance with claim 3 wherein said eject means comprises a plurality of balls spaced circumferentially about said passage and communicating therewith, the last mentioned balls when moved to said active position being adapted to engage another shoulder on the tool shank and pushingly urge the tool axially out of said passage, said last mentioned balls being substantially equally spaced with respect to one another circumferentially of said passage and being staggered with respect to the first mentioned balls.

5. A tool holder in accordance with claim 1 wherein said body comprises a head portion and a base portion, a tubular-like stem portion connecting said head portion with said base portion, said stem portion partially defining said passage, said head and base portions being substantially wider than said stem portion, said gripping means and said eject means comprising circumferentially spaced vertically disposed sets of ball-like members mounted in openings in said stem portion with one set of the ball-like members being adapted to extend into said passage when in said active position for gripping coaction with the shank of the tool to form said gripping means, and said cam means being rotatable on said base portion about said stem portion and adapted for coaction with said one set of said ball-like members for moving the latter to said active position, said cam means being rotatable toward said second position for coaction with the other set of ball-like members for ejecting the tool shank from the passage, said cam means comprising a sectional ring-like member having cam surfaces on the interior thereof adapted for engaging coaction with said ball-like members, and means detachably connecting the sections of said ring-like member together.

6. A tool holder in accordance with claim 1 including handle means projecting laterally from said cam means and being secured thereto for actuating said cam means from said one position to said second position.

7. A tool holder in accordance with claim 5 including passageway means formed in said head portion communicating with said passage for supplying fluid to said passage.

8. A tool holder comprising a body having a passage therein adapted to receive a shank of a tool, means mounted on said body for movement from an inactive position to an active position and vice versa, for gripping the tool shank when in said active position, cam means movably mounted with respect to said gripping means and operative when moved to one position to move said gripping means to said active position, and eject means movably mounted on said body and operative to be moved by said cam means to an active position to initiate ejection of the tool shank from said passage, said movement of said cam means from said one position to a second position causing said eject means to be moved to said active position, and permitting movement of said gripping means to said inactive position, and the combination therewith of said tool, said body comprising a head portion and a base portion with a stem portion connecting said head portion with said base portion, said passage extending from exteriorly of said base portion into said stem portion, said base portion having spaced accurately dimensioned slots therein, said tool having accurately dimensioned lugs thereon formed accurately complementary to said slots in said base portion, for precisely locating the tool with respect to the holder, the tool shank having a sliding fit in said passage, for ready entry of said shank into said passage, and whereby said lugs coacting in said slots operate to accurately align the tool with the holder and with respect to said passage in the holder.

9. The combination in accordance with claim 8 wherein said tool comprises an electrode, said shank being secured to said electrode and projecting upwardly therefrom, said tool shank having a lengthwise extending duct extending completely therethrough and continuing through said electrode for communicating said passage with the exterior of the tool, for applying fluid through said passage and said duct to a work part.

10. The combination in accordance with claim 8 including index means on said base portion adapted for coaction with index means on said tool for predetermining an indexed position of the tool with respect to the holder.

11. The combination in accordance with claim 10 wherein said index means comprises complementary projection and recess means on said base portion and said tool, adapted for mating non-interfering coaction when said tool is in predetermined indexed position with respect to the holder, and wherein said projection means is adapted for non-mating interfering coaction when said tool is in non-properly indexed position with respect to the holder, whereby said gripping means is prevented from moving to said active position by said tool shank.

12. A tool holder in accordance with claim 5 wherein said openings in said stem are constricted at the inner defining surface of said passage for preventing said ball-like members from passing completely through said openings and into said passage.

13. The combination in accordance with claim 8 wherein said shank is of generally cylindrical configuration in horizontal section, the distal end of said shank being of a smaller diameter as compared to the proximate end of said shank, said shank having obliquely disposed axially spaced shoulder means thereon intermediate said ends, said shoulder means adjacent said distal end being adapted for holding engagement with said gripping means in said active position of the latter, said shoulder means furtherest from said distal end being adapted for engagement with said eject means upon movement of said cam means to said second position, and a neck section disposed intermediate said spaced shoulder means and connecting the latter, said neck section being of a smaller diameter than said distal end.

14. The combination in accordance with claim 13 wherein said passage at the entry end portion thereof is wider than at its opposite end portion whereby entry of said tool shank is facilitated, said opposite end portion having a sliding fit with said distal end of said shank and said entry end portion having a sliding fit with said proximate end of said shank, in the mounted and gripped position of said tool in said holder.

* * * * *